United States Patent [19]

McCready et al.

[11] Patent Number: 4,711,947

[45] Date of Patent: Dec. 8, 1987

[54] TRANSLUCENT POLYETHERIMIDE ESTER COMPOSITIONS

[75] Inventors: Russell J. McCready; John A. Tyrell, both of Mt. Vernon, Ind.

[73] Assignee: General Electric Company, Pittsfield, Mass.

[21] Appl. No.: 913,397

[22] Filed: Sep. 30, 1986

[51] Int. Cl.$^4$ .................. C08G 63/44; C08G 69/44
[52] U.S. Cl. .................... 528/288; 528/289; 528/296; 528/302; 528/305
[58] Field of Search .............. 528/288, 289, 296, 302, 528/305

[56] References Cited

U.S. PATENT DOCUMENTS

| | | | |
|---|---|---|---|
| 4,121,266 | 10/1978 | Kovacs et al. | 528/288 |
| 4,429,072 | 1/1984 | Reiter et al. | 524/591 |
| 4,544,734 | 10/1985 | McCready | 528/288 |
| 4,556,688 | 12/1985 | McCready et al. | 525/33 |
| 4,556,705 | 12/1985 | McCready | 528/289 |
| 4,605,728 | 8/1986 | Tung | 528/289 |
| 4,661,582 | 4/1987 | McCready | 528/292 |

*Primary Examiner*—Lucille M. Phynes
*Attorney, Agent, or Firm*—William F. Mufatti

[57] ABSTRACT

Translucent polyetherimide ester polymers are provided comprised of the reaction products of (i) at least one cyclohexane dimethanol, (ii) at least one cyclohexane dicarboxylic acid or an ester forming reactive derivative thereof, and (iii) either a combination of at least one tricarboxylic acid and at least one poly(oxy alkylene) diamine, or at least one poly(oxy alkylene) diimide diacid.

30 Claims, No Drawings

TRANSLUCENT POLYETHERIMIDE ESTER COMPOSITIONS

BACKGROUND OF THE INVENTION

Poly(etherimide ester) elastomers comprised of the reaction products of (a) a diol, (b) a dicarboxylic acid, (c) a poly(oxy alkylene)diamine, and (d) a tricarboxylic acid or its derivatives are known and described in U.S. Pat. Nos. 4,544,734 and 4,556,705 to McCready and in U.S. Pat. No. 4,556,688 to McCready et al. These poly(etherimide ester) elastomers exhibit excellent stress-strain properties, low tensile set, high melting temperatures and/or excellent strength/toughness characteristics as well as superior flexibility which are especially suitable for molding and extrusion applications.

However, it would be very advantageous if poly(etherimide ester) elastomers could be provided which were translucent. It has now been found that poly(etherimide ester) elastomers which are translucent can be provided by utilizing as the diol component (a) a cyclohexane dimethanol and as the dicarboxylic acid component (b) a cyclohexane dicarboxylic acid or ester forming reactive derivative thereof.

SUMMARY OF THE INVENTION

In accordance with the instant invention there are provided tough, flexible and translucent poly (etherimide ester) elastomers. The elastomers of the instant invention are comprised of the reaction products of, as the dicarboxylic acid component at least one cyclohexane dicarboxylic acid or an ester forming reactive derivative thereof, and as the diol component cyclohexane dimethanol.

DESCRIPTION OF THE INVENTION

In accordance with the instant invention there are provided poly(etherimide ester) elastomers which are tough, flexible and translucent. The poly(etherimide ester) elastomers of the instant invention are comprised of the reaction products of (a) a diol component consisting essentially of at least one cyclohexane dimethanol, (b) a dicarboxylic acid component consisting essentially of at least one cyclohexane dicarboxylic acid or an ester forming reactive derivative thereof, (c) at least one high molecular weight poly(oxy alkylene) diamine, and (d) at least one tricarboxylic acid or derivative thereof.

The diol component (a) is comprised of 100 mole percent cyclohexane dimethanol. The cyclohexane dimethanol may be 1,2-cyclohexane dimethanol, 1,3-cyclohexane dimethanol, 1,4-cyclohexane dimethanol, and mixtures thereof. The cyclohexane dimethanol may be comprised of the cis or trans isomer or mixtures thereof.

The dicarboxylic acid component (b) is comprised of 100 mole percent cyclohexane dicarboxylic acid or its ester forming reactive derivative. The cyclohexane dicarboxylic acid may be the 1,2-cyclohexane dicarboxylic acid, 1,3-cyclohexane dicarboxylic acid, the 1,4-cyclohexane dicarboxylic acid, or mixtures thereof. Preferably the cyclohexane dicarboxylic acid is 1,4-cyclohexane dicarboxylic acid. The acid may be comprised of the cis or trans isomers, as well as mixtures of the cis and trans isomers. The acid may contain substituent groups of the ring carbon atoms of the cyclohexane moiety, provided these substituents do not interfere in the poly(etherimide ester) forming reaction and/or do not adversely affect the properties of the elastomer.

The cyclohexane dicarboxylic acid or its reactive derivative may be represented by the general formula

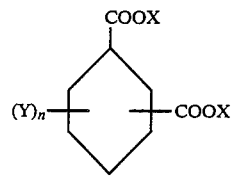

wherein:
X is a monovalent radical, preferably selected from lower alkyl radicals, or hydrogen;
Y is a monovalent hydrocarbon radical, preferably an alkyl radical, and more preferably a lower alkyl radical; and
n is an integer having a value of from 0 to 4 inclusive.

In a preferred embodiment n is zero, i.e., the cyclohexane dicarboxylic acid is an unsubstituted acid. In such a case all of the ring carbon atoms, except for those containing the —COOX groups, have two hydrogen atoms attached thereto, while the two ring carbon atoms having the —COOX groups attached thereto also have one hydrogen atom bonded thereto.

The poly(oxy alkylene)diamines (c) suitable for use in the present invention may be characterized by the following general formula:

$$H_2N-G-NH_2 \qquad \text{I.}$$

wherein G is the radical remaining after the removal of the amino groups of a long chain alkylene ether diamine. These polyether diprimary diamines are available commercially from Texaco Chemical Company under the trademark Jeffamine. In general they are prepared by known processes for the amination of glycols. For example, they may be prepared by aminating the glycol in the presence of ammonia, Raney nickel catalyst and hydrogen as set forth in Belgian Pat. No. 634,741. Alternately, they may be prepared by treating the glycol with ammonia and hydrogen over a Nickel-Copper-Chromium catalyst as taught by U.S. Pat. No. 3,654,370. Other methods for the production thereof include those taught in U.S. Pat. Nos. 3,155,728 and 3,236,895 and in French Pat. Nos. 1,551,605 and 1,466,708, all of which are incorporated by reference.

The long chain ether diamines suitable for use herein are the polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(oxy alkylene)diamines including poly (ethylene ether)diamine, poly(propylene ether)diamine, poly(tetramethylene ether)diamine; random or block copolymers of ethylene oxide and propylene oxide including propyleneoxide and poly(propylene oxide) terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbone-to-oxygen mole ratio in the diamine does not exceed about 4.3 to 1). Polyformyl diamines prepared by reacting formaldehyde with diols such as 1,4-butanediol and 1,5-pentanediol and subsequently aminating are useful. Especially preferred poly(oxy alkylene)diamines are poly(propylene ether)-diamine, poly(tetramethylene ether)diamine and poly-(ethylene ether)glycols end-capped with poly(proylene ether)glycol and/or propylene oxide and subsequently aminated.

In general, the poly(oxy alkylene)diamines useful within the scope of the present invention will have an average molecular weight of from about 600 to about 12,000, preferably from about 900 to about 4,000.

The tricarboxylic acid (d) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and preferably is substantially nonimidizable.

While trimellitic anhydride is preferred as the tricarboxylic acid component, any number of suitable tricarboxylic acid constituents will occur to those skilled in the art including, but not limited to, 2,6,7-naphthalene tricarboxylic anhydride, 3,3',4-diphenyl tricarboxylic anhydride, 3,3',4-benzophenone tricarboxylic anhydride, 1,3,4-cyclopentane tricarboxylic anhydride, 2,2',3-diphenyl tricarboxylic anhydride, diphenyl sulfone-3,3',4-tricarboxylic anhydride, ethylene tricarboxylic anhydride, 1,2,5-naphthalene tricarboxylic anhydride, 1,2,4-butane tricarboxylic anhydride, 3,4-dicarboxyphenyl-3-carboxylphenyl ether anhydride, 1,3,4-cyclohexane tricarboxylic anhydride, and the like. These tricarboxylic acid materials can be characterized by the following general formula:

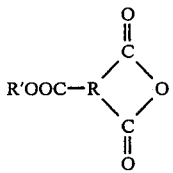

II.

wherein:
R is a trivalent organic radical, preferably a trivalent $C_2$–$C_{20}$ aliphatic or cycloaliphatic, or a $C_6$–$C_{20}$ aromatic radical. The preferred trivalent radicals are hydrocarbon radicals.
R' is preferably hydrogen or a monovalent organic radical preferably selected from the group consisting of $C_1$–$C_6$ aliphatic and/or cycloaliphatic radicals and $C_6$–$C_{12}$ aromatic radicals, e.g., benzyl; most preferably hydrogen.

The amount by which each of the foregoing reactants is employed in the preparation of the polymers of the present invention is not, in general, critical and depends, in part, upon the desired properties of the resultant polymer. Obviously, sufficient amounts of diol versus diacid and tricarboxylic acid versus diamine must be present, as recognized in the art, to allow for substantially complete polymerization.

This type of one-pot reaction involving the reactions of (a) a diol component, (b) a dicarboxylic acid component, (c) a poly(oxy alkylene) diamine component, and (c) a tricarboxylic acid component is described in U.S. Pat. No. 4,556,588 to McCready et al., incorporated herein by reference. In this type of one-pot reaction to produce the polyetherimide ester elastomer the amount of diol (a) employed will be, in general, a molar excess, preferably about 1.5 molar equivalents, based on the combined molar equivalents of dicarboxylic acid (b) and of the total moles of tricarboxylic acid (d). The amount of tricarboxylic acid (d) employed will preferably be about two molar equivalents based on the number of moles of the polyoxyalkylene diamine (c). Obviously, less than two molar equivalents would result in incomplete imidization of the diamine resulting in potentially poorer properties. Conversely, greater than two molar equivalents of the tricarboxylic acid (d) may lead to cross-linking and/or branching of the polymer. Generally, mole relations of 2 moles tricarboxylic acid (d) to 0.85 to 1.15 moles of polyoxyalkylene diamine have been found to yield useful polymers. Finally, the amount by which the dicarboxylic acid (b) and the diamine (c) are used will be such that the weight ratio of the theoretical amount of polyoxyalkylene diimide diacid formable from the diamine (c) and tricarboxylic acid (d) to the dicarboxylic acid (b) will be from about 0.25 to about 2.0 preferably from about 0.4 to about 1.4.

The instant polyetherimide esters may also be prepared by a two-pot reaction involving the reactions of (a) a diol component, (b) a dicarboxylic acid, and (e) a polyoxyalkylene diimide diacid. Such a two-pot reaction is described in U.S. Pat. No. 4,556,705, to McCready, incorporated herein by reference. Basically, in this process the poly(oxy alkylene) diamine (c) is reacted with a tricarboxylic acid (d) to form a polyoxyalkylene diimide diacid is then reacted with the diol (a) and the dicarboxylic acid (b).

The polyoxyalkylene diimide diacid (e) may be represented by the general formula

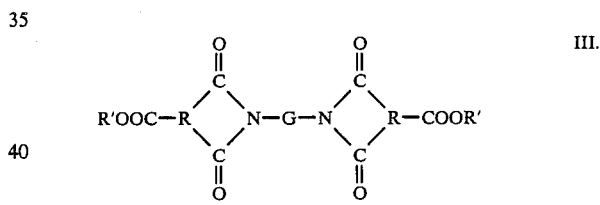

III.

wherein G, R and R' are as defined hereinafore.

The polyoxyalkylene diimide diiacids of Formula III suitable for use herein are high molecular weight diimide diacids wherein the average molecular weight is greater than about 700, most preferably greater than about 900. They may be prepared by the imidization reaction of one or more tricarboxylic acid components (d) containing two vicinal carboxyl groups of an anhydride group and an additional carboxyl group which must be esterifiable and preferably is nonimidizable with a high molecular weight poly(oxy alkylene)diamine (c). These polyoxyalkylene diimide diacids and processes for their preparation are disclosed in said U.S. Pat. No. 4,556,705, to McCready, incorporated herein by reference. Briefly, these polyalkylene diimide diacids may be prepared by known imidization reactions including melt synthesis or by synthesizing in a solvent system. Such reactions will generally occur at temperatures of from 100° C. to 300° C., prferably at from about 150° C. to about 250° C. while drawing off water or in a solvent system at the reflux temperature of the solvent or azeotropic (solvent) mixture.

In this two-pot process the weight ratio of the above ingredients, as in the one-pot process, is also not critical. However, it is preferred that the diol be present in at least a molar equivalent amount, preferably a molar excess, most preferably at least 150 mole % based on the moles of dicarboxylic acid (b) and polyoxyalkylene diimide diacid (e) combined. Such molar excess of diol will allow for optimal yields, based on the amount of acids, while accounting for the loss of diol during esterification/condensation.

Further, while the weight ratio of the dicarboxylic acid (b) to polyoxyalkylene diimide diacid (e) is not critical preferred compositions are those in which the weight ratio of the polyoxyalkylene diimide diacid (e) to dicarboxylic acid (b) is from about 0.25 to about 2, preferably from about 0.4 to about 1.4. The actual weight ratio will be dependent upon the specific polyoxyalkylene diimide diacid used and more importantly upon the desired physical and chemical properties of the resultant polyetherimide ester.

It is likewise possible, as described in U.S. Pat. No. 4,556,688, to prepolymerize the aromatic dicarboxylic acid (b) and the diol (a) to form a prepolyester. Forming the prepolyester of (a) and (b) can be achieved by conventional esterification techniques as described in U.S. Pat. Nos. 2,465,319, 3,047,439 and 2,910,466, all of which are incorporated herein by reference.

In its preferred embodiments, the compositions of the instant invention will comprise the reaction products of dimethyl cyclohexanedicarboxylate; cyclohexane dimethanol; and either (i) a poly (oxy alkylene)diamine of a molecular weight of from about 600 to about 12,000, preferably from about 900 to about 4,000, and trimellitic anhydride, or (ii) a polyoxyalkylene diimide diacid prepared from a polyoxyalkylene diamine of molecular weight of from about 600 to about 12,000, preferably from about 900 to about 4,000, and trimellitic anhydride. In its more preferred embodiment the cyclohexane dimethanol will be 1,4-cyclohexane dimethanol and the dicarboxylic acid will be 1,4-dimethyl cyclohexane dicarboxylate.

The instant polyetherimide esters may be prepared by conventional esterification/condensation reactions for the production of polyesters. These processes are described, inter alia, in U.S. Pat. Nos. 3,763,109, 3,651,014 and 3,801,547, all of which are incorporated herein by reference, and in U.S. Pat. Nos. 4,556,705 and 4,556,688, also incorporated herein by reference.

The polyetherimide esters of the instant invention contain at least the following two recurring structural units:

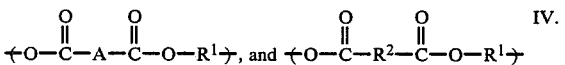

wherein:
A is the residue of the polyoxyalkylene diimide diacid, e.g.,

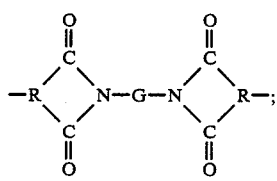

$R^1$ is the residue of the cyclohexane dimethanol absent the two hydroxyl groups; and $R^2$ is the residue of the cyclohexane dicarboxylic acid minus the two carboxyl groups.

In the process of the present invention for the preparation of the polyetherimide ester elastomers, particularly where all the reactants are charged to the reactor together or where the poly(oxy alkylene) diimide diacid is preformed and excess tricarboxylic acid is present, a minor amount of the tricarboxylic acid or anhydride may react with the available hydroxyl groups and ultimately function as a branching agent in the finished polymer. Within limits, the degree of branching in the finished polymer can be controlled by varying the mole ratio of tricarboxylic acid (d) to poly(oxy alkylene)diamine (c). An excess of diamine reduces the degree of branching, while an excess of the tricarboxylic acid increases branching. In addition to controlling branching by varying the tricarboxylic acid/diamine mole ratio, one can compensate for branching by introducing a mono-functional reactant such as benzoic acid in minor amounts.

With reference to branching it should be noted that polymers of this invention, when prepared from preformed diimide-diacids, are substantially free of branching. If branching is desired, one needs only to introduce a branching agent such as trimellitic anhydride along with the preformed diimide-diacid. The amount of branching agent generally will be less than 0.15 mole per mole of diimide diacid or ester thereof. Useful branching agents other than trimellitic anhydride include, but are not limited to, trimethyl trimellitate, glycerol, trimethylol propane, trimesic acid and its esters, and the like.

Additionally, while not required, it is customary and generally preferred to utilize a catalyst or catalyst system in the process for the production of the polyetherimide esters of the present invention. In general, any of the known ester-interchange and polycondensation catalysts may be used. Although two separate catalysts or catalyst systems may be used in the preparation of the polyetherimide ester elastomers of the present invention, one for the ester interchange and one for the polycondensation, it is preferred, where appropriate, to use one catalyst or catalyst system for both the ester interchange and the polycondensation. In these instances where two separate catalysts or catalyst systems are used, it is preferred and advantageous to render the ester-interchange catalyst ineffective following the completion of the precondensation reaction by means of known catalyst inhibitors or quenchers, in particular phosphorus compounds such as phosphoric acid, phosphenic acid, phosphonic acid, and the alkyl or aryl esters or salts thereof, in order to increase the thermal stability of the polymer.

Exemplary of the suitable known catalysts there may be given the acetates, carboxylates, hydroxides, oxides, alcoholates or organic complex compounds of zinc, manganese, antimony, cobalt, lead, calcium, and the alkali metals insofar as these compounds are soluble in the reaction mixture. Specific examples include zinc acetate, calcium acetate, and combinations thereof with antimony tri-oxide and the like. These catalysts, as well as additional useful catalysts are described in U.S. Pat. Nos. 2,465,319, 2,534,028, 2,850,483, 2,892,815, 2,937,160, 2,998,412, 3,047,549, 3,110,693 and 3,385,830, among others, incorporated herein by reference.

Where the reactants and reactions allow, it is preferred to use the titanium catalysts including the inorganic and organic titanium containing catalysts, such as those described, for example, in U.S. Pat. Nos. 2,720,502, 2,727,881, 2,729,619, 2,822,348, 2,906,737, 3,047,515, 3,056,817, 3,056,818 and 3,075,952, all of which are incorporated herein by reference. Especially preferred are the organic titanates such as tetra-butyl titanate, tetra-iso-propyl titanate, and tetraoctyl titanate and the complex titanates derived from alkali and alkaline earth metal alkoxides and titanate esters, most preferably organic titanates. These too may be used alone or in combination with other catalysts such as for example, zinc acetate, calcium acetate, magnesium acetate or antimony trioxide, and/or with a catalyst quencher as described. The catalyst should be used in catalytic amounts, i.e., from about 0.005 to about 2.0 percent by weight based on the total reactants.

While the amount of diol will directly affect the degree of polymerization achieved in the polymerization process, the weight ratio of dicarboxylic acid to the theoretical yield of polyoxyalkylene diimide diacid will have the greater impact on the properties of the final polymer. The actual weight ratio employed will be dependent upon the specific polyoxyalkylene diimide diacid used and more importantly, the desired physical properties and chemical properties of the resultant poly etherimide ester. In general, the lower the ratio of polyoxyalkylene diimide diacid to dicarboxylic acid the better the strength, crystallization and heat distortion properties of the polymer. Alternately, the higher the ratio, the better the flexibility, tensile set and low temperature impact characteristics.

Both batch and continuous methods can be used for any stage of the ether imide ester polymer preparation. Polycondensation of the polyester prepolymer with the poly(oxy alkylene)diimide diacid can also be accomplished in the solid phase by heating finely divided solid polyester prepolyemr with the diimide diacid in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyetherimide esters of this invention possess good resistance toward heat aging and photodegradation, it is advisable to stabilize these compounds by the addition of an antioxidant.

Many of the oxidative and/or thermal stabilizers known in the art for copolyesters may be used in the practice of the present invention. These may be incorporated into the composition either during polymerization or while in a hot melt stage following polymerization. Satisfactory stabilizers include the phenols and their derivatives, amines and their derivatives, compounds containing both hydroxyl and amine groups, hydroxazines, oximes, polymeric phenolic esters and salts of multivalent metals in which the metal is in its lower valence state. Some specific examples of these stabilizers are described in U.S. Pat. No. 4,556,688, incorporated herein by reference.

The instant compositions can be stabilized against ultraviolet radiation by the addition thereto of the well known ultraviolet radiation absorbers such as, for example, the substituted benzophenones and benzotriazoles.

Further, the properties of these polymers can be modified by incorporation of various conventional and well known inorganic fillers such as carbon black, silica gel, alumina, clays, and chopped fiberglass. These may be incorporated in amounts up to about 50% by weight, preferably up to about 30% by weight.

The polymers of the instant invention may also optionally contain the various well known flame retardants. These compounds generally contain halogen and/or sulfur atoms. They may be inorganic or organic. Some useful flame retardants are the alkali and alkaline earth metal salts of organic sulfonic acids.

DESCRIPTION OF THE PREFERRED EMBODIMENT

The following examples are set forth to more fully illustrate the present invention. They are presented as illustrative of the present invention and are not to be construed as limiting thereof. In the examples all parts and percentages are on a weight basis unless otherwise specified.

The following examples illustrate the polyetherimide esters of the instant invention.

EXAMPLE 1

Into a reactor vessel there are charged 301 parts by weight of 1,4-dimethyl cyclohexanedicarboxylate, 321 parts by weight of 1,4-cyclohexane dimethanol, 9 parts by weight of trimellitic anhydride, and 78 parts by weight of a poly(oxy alkylene) diimide diacid (prepared by the imidization of trimellitic anhydride with Texaco Chemical Company's Jeffamine ® D2000, a polypropylene ether diamine having an average molecular weight of 2,000). Also present in the reactor vessel are a phenolic stabilizer and a titanate catalyst. The mixture is heated to about 180° C. whereupon methanol is liberated. After the theoretical amount of methanol is removed the temperature is raised to about 250° C. and a vacuum applied to produce the polyetherimide ester.

The optical appearance, Flexural Modulus (in psi $\times 10^3$ determined in accordance with ASTM D790), % Tensile Elongation (determined in accordance with ASTM D638), are measured and the results are set forth in Table I.

EXAMPLE 2

The procedure of Example 1 is substantially repeated except that into the reactor are charged 301 parts by weight of 1,4-dimethyl cyclohexanedicarboxylate, 321 parts by weight of 1,4-cyclohexane dimethanol, 7.5 parts by weight of trimellitic anhydride, and 176 parts by weight of the poly(oxy alkylene) diimide diacid of the type utilized in Example 1.

The properties are determined and the results are set forth in Table I.

In Examples 1 and 2 the 1,4-dimethyl cyclohexanedicarboxylate is comprised of a mixture of the cis and trans isomers, 33% of the trans isomer and 67% of the cis isomer. The 1,4-cyclohexane dimethanol is also comprised of a mixture of the cis and trans isomers, 68% of the trans isomer and 32% of the cis isomer.

TABLE I

| Example No. | % tensile elongation | flexural modulus | appearance |
| --- | --- | --- | --- |
| 1 | 500 | <10,000 psi | translucent |

TABLE I-continued

| Example No. | % tensile elongation | flexural modulus | appearance |
| --- | --- | --- | --- |
| 2 | 1100 | <10,000 psi | translucent |

Additionally, test bars of the polyetherimide esters of Examples 1 and 2 were prepared and subjected to the notched Izod test in accordance with ASTM D256. There was no break in either the test bar made from the polymer of Example 1 or in the test bar made from the polymer of Example 2.

Obviously other modifications will suggest themselves to those skilled in the art in light of the above detailed description. All such modifications are within the full intended scope of the present invention as defined by the appended claims.

What is claimed is:

1. A translucent polyetherimide ester composition comprising the reaction products of:
   (i) at least one cyclohexane dimethanol;
   (ii) at least one cyclohexane dicarboxylic acid or an ester forming reactive derivative thereof: and
   (iii) a set of reactants selected from
      (a) (i) at least one high molecular weight poly(oxy alkylene)diamine, and (ii) at least one tricarboxylic acid or a derivative thereof, or
      (b) at least one poly(oxy alkylene)diimide diacid.

2. The composition of claim 1 wherein said cyclohexane dimethanol is selected from 1,2-cyclohexane dimethanol, 1,3-cyclohexane dimethanol, 1,4-cyclohexane dimethanol, or mixtures thereof.

3. The composition of claim 1 wherein said cyclohexane dicarboxylic acid or its ester forming reactive derivative is represented by the formula

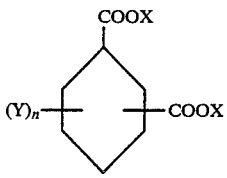

wherein:
X is independently selected from hydrogen or monovalent radicals;
Y is independently selected from monovalent radicals; and
n is an integer having a value of from 0 to about 4.

4. The composition of claim 3 wherein said monovalent radical represented by X is selected from organic radicals or halogen radicals.

5. The composition of claim 4 wherein said organic radicals are selected from lower alkyl radicals.

6. The composition of claim 5 wherein said alkyl radical is methyl.

7. The composition of claim 3 wherein said monovalent radical represented by Y is selected from organic radicals.

8. The composition of claim 7 wherein said organic radicals are hydrocarbon radicals.

9. The composition of claim 8 wherein said hydrocarbon radicals are alkyl radicals.

10. The composition of claim 3 wherein n is zero.

11. The composition of claim 1 wherein (iii) is (a).

12. The composition of claim 11 wherein said poly(oxy alkylene)diamine is represented by the formula

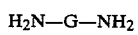

wherein G is the radical remaining after removal of the amino groups of a long chain poly(oxy alkyllene)diamine and said poly(oxy alkylene)diamine has an average molecular weight of from about 600 to about 12,000.

13. The composition of claim 12 wherein said poly(oxy alkylene)diamine has an average molecular weight of from about 900 to about 4,000.

14. The composition of claim 12 wherein said poly(oxy alkylene)diamine is derived from a long chain ether glycol selected from poly(ethylene ether glycol), poly(propylene ether)glycol, poly (tetramethylene ether)glycol, copoly(propylene ether-ethylene ether)glycol, or mixtures thereof.

15. The composition of claim 14 wherein said long chain ether glycol is poly(propylene ether) glycol.

16. The composition of claim 11 wherein said tricarboxylic acid (iii)(a)(ii) is represented by the formula

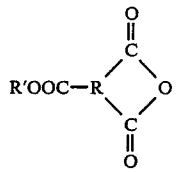

wherein R is a $C_2$ to $C_{20}$ trivalent aliphatic, cycloaliphatic, or aromatic radical, and R' is hydrogen or a $C_1$ to $C_6$ aliphatic radical.

17. The composition of claim 16 wherein said tricarboxylic acid is trimellitic anhydride.

18. The composition of claim 11 wherein the weight ratio of the theoretical amount of poly (oxy alkylene)diimide diacid formable from the diamine (iii)(a)(i) and the tricarboxylic acid (iii)(a)(ii) to the amount of said dicarboxylic acid (ii) is from about 0.25 to about 2.0.

19. The composition of claim 18 wherein the weight ratio of the theoretical amount of poly (oxy alkylene)diimide diacid formable from said diamine (iii)(a)(i) and tricarboxylic acid (iii) (a)(ii) to the amount of said dicarboxylic acid (ii) is from about 0.4 to about 1.4.

20. The composition of claim 11 wherein (iii) is at least one poly(oxy alkylene)diimide diacid (b).

21. The composition of claim 20 wherein said diimide diacid is derived from at least one poly (oxy alkylene)diamine and at least one tricarboxylic acid containing two vicinal carboxyl groups and an additional carboxyl group.

22. The composition of claim 21 wherein said poly(oxy alkylene)diimide diacid is represented by the formula

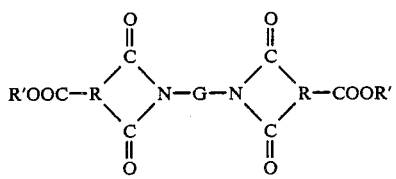

wherein each R is independently selected from C$_2$–C$_{20}$ aliphatic or cycloaliphatic trivalent organic radical, or C$_6$–C$_{20}$ aromatic trivalent organic radical; each R' is independently selected from hydrogen, C$_1$–C$_6$ aliphatic or cycloaliphatic monovalent organic radical, or C$_6$–C$_{12}$ aromatic monovalent organic radical; and G is the radical remaining after removal of the amino groups of a long chain poly(oxy alkylene) diamine having an average molecular weight of from about 600 to about 12,000.

23. The composition of claim 22 wherein said poly(oxy alkylene)diimide diacid is such that each R is a C$_6$ trivalent aromatic hydrocarbon radical, each R' is hydrogen, and G is the radical remaining after the removal of the amino groups of a long chain poly(oxy alkylene)diamine having an average molecular weight of from about 900 to about 4,000.

24. The composition of claim 23 wherein said poly(oxy alkylene) diimide diacid is derived from trimellitic anhydride and a poly(oxy alkylene) diamine selected from poly(propylene oxide)diamine and a copoly(propylene oxide-ethylene oxide)diamine having predominantly poly(ethylene oxide) in the backbone.

25. The composition of claim 20 wherein the weight ratio of said poly(oxy alkylene)diimide diacid (iii)(b) to said dicarboxylic acid (ii) is from about 0.25 to about 2.0.

26. The composition of claim 25 wherein the weight ratio of said poly(oxy alkylene)diimide diacid (iii)(b) to said dicarboxylic acid (ii) is from about 0.4 to about 1.4.

27. A translucent polyetherimide ester polymer comprising at least the following recurring structural units:

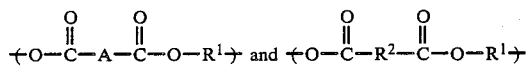

wherein
R$^1$ is the hydrocarbon residue of cyclohexane dimethanol absent the two hydroxyl groups;
R$^2$ is the hydrocarbon residue of cyclohexane dicarboxylic acid absent the two carboxyl groups; and
A is the residue of a high molecular weight poly(oxy alkylene)diimide diacid absent the two carboxyl groups.

28. The polymer of claim 27 wherein A is represented by the formula

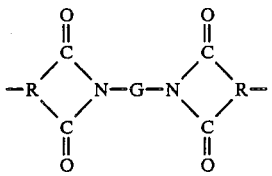

wherein:
each R is independently selected from trivalent organic radicals selected from C$_2$ to C$_{20}$ aliphatic or cycloaliphatic radicals, or C$_6$ to C$_{20}$ aromatic radicals; and
G is the radical remaining after removal of the amino groups of a long chain poly(oxy alkylene) diamine having an average molecular weight of from about 600 to about 12,000.

29. The composition of claim 28 wherein said poly(oxy alkylene)diamine has an average molecular weight of from about 900 to about 4,000.

30. The composition of claim 29 wherein R is a C$_6$ trivalent aromatic radical.

* * * * *